United States Patent
Moody

[15] 3,665,191
[45] May 23, 1972

[54] FILTER FOR COMPENSATING EFFICIENCY DIFFERENCES IN AN OPTICAL SYSTEM

[72] Inventor: Norman Frank Moody, Toronto, Ontario, Canada

[73] Assignee: Canadian Patents and Development Limited, Ottawa, Ontario, Canada

[22] Filed: Nov. 28, 1969

[21] Appl. No.: 880,730

[30] Foreign Application Priority Data

Dec. 16, 1968 Great Britain.....................59,686/68

[52] U.S. Cl. .........................250/86, 250/65 R, 250/213 VT
[51] Int. Cl. .........................................................G21h 3/00
[58] Field of Search................................250/65, 86, 213 VT

[56] References Cited

UNITED STATES PATENTS 2,913,582  11/1959  Collins et al......................250/65 R X
3,166,998   1/1965  Watson............................250/65 R X
3,247,378   4/1966  Erikson............................250/65 R X
3,487,559   1/1970  Freedman........................250/65 R X Primary Examiner—Archie R. Borchelt
Attorney—Douglas S. Johnson

[57] ABSTRACT

A compensating filter for use in a registered position at an optical plane in an optical system having differences in efficiencies such that energy from a uniform source creates light of varying intensities over the area of the optical plane, the filter comprising a film negative produced by exposing the film while in registered position at the optical plane to a uniform source through the preceding elements of the system and then developing the film so that its density variations match the variations in light intensities arriving at the optical plane over the area thereof, the negative having its greatest density where the light intensity was greatest and vice versa whereby energy from a uniform source after being translated through the system and film negative emerges as substantially uniform light.

7 Claims, 1 Drawing Figure

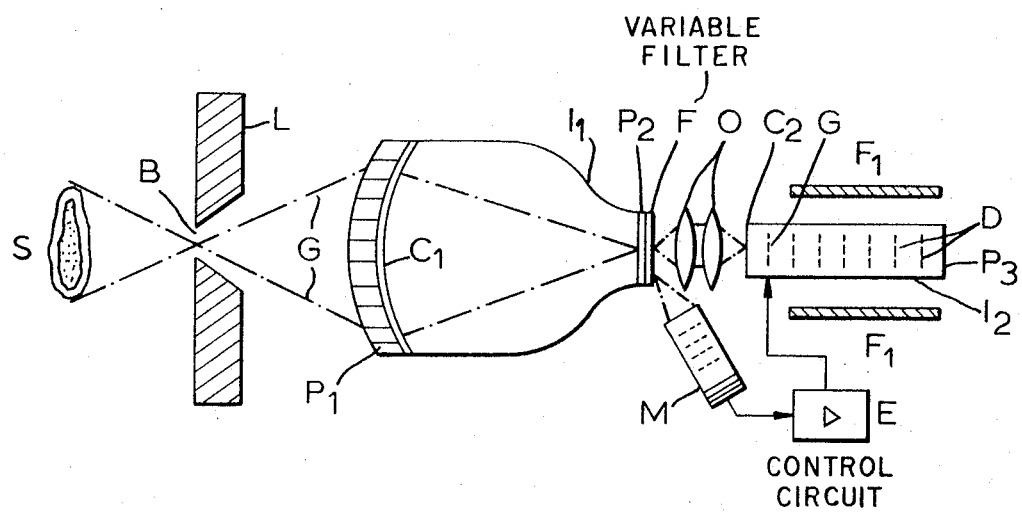

FILTER FOR COMPENSATING EFFICIENCY DIFFERENCES IN AN OPTICAL SYSTEM

Field of Invention

This invention relates to a compensating filter for optical systems such as those employing image intensifiers which, in response to uniform stimulii, have non uniform responses over an optical plane. For example, the invention is highly useful in gamma ray cameras which normally employ two or more image intensifiers and gamma ray cameras particularly benefitting from the invention are high speed medical gamma ray cameras which are utilized to photograph rapidly changing isotope distributions involving relatively low concentrations of the isotopes.

BACKGROUND OF INVENTION

In gamma ray cameras, the particular optical system to which the invention may be conveniently related, the gamma rays given off by the source to be photographed after collimation are directed to strike a phosphor screen which may be a single crystal or a mosaic of crystals such as sodium iodide and are converted into scintillations of light. These scintillations which occur on the phosphor screen create the signals of interest when finally converted to picture elements.

To intensify the scintillations which in total constitute the image produced by the phosphor they are fed to the photocathode of an image intensifier. The photocathode, which is optically coupled to the phosphor, converts each scintillation into a corresponding small pencil of electrons. Normally two or more image intensifiers are required and therefore the pencil of electrons or electron current produced by the photocathode by each such scintillation from the first phosphor screen is delivered to a second or output phosphor or screen which in turn reconverts the electron stream into a light flash or scintillation for further processing, e.g. through a suitable lens system to a further image intensifier employing a photocathode and an output phosphor.

It will be understood that where the first phosphor is a crystal mosaic it is made of a large number of crystals, something in the order of one-fourth inch square, and these crystals will not have equal responses to the gamma rays. Even for a single-crystal phosphor such nonuniformity will exist. Moreover it will also be understood that the response of the photocathode will not be precisely uniform over its entire surface and for a given intensity of scintillation the electron stream released will vary from point to point throughout the area of the photocathode.

The existence of these differences of efficiency of the crystal mosaic elements and of the photocathode areas in optical contact with these elements has given rise to serious problems in masking the true image which the camera is intended to record particularly where the source of the gamma ray radiation is weak. This will be appreciated since it is uncertain whether the variations in the intensity of the image ultimately recorded by the camera are a result of the variation of intensity of the emitted gamma rays or the variation of the efficiency of the respective portions of the crystal screen or photocathode surface.

Moreover in addition to scintillations produced on the phosphor screen by the gamma rays produced by the source to be photographed, there are other scintillations also produced on the screen caused for example by cosmic rays and gamma rays degenerated by Compton scatter in the tissue. These latter scintillations have a different brilliance or energy level from the scintillations produced by the source which it is desired to photograph and constitute unwanted noise. These noise scintillations are capable of being separated from the picture scintillations by an energy level discriminator which will only allow signals of a predetermined energy range to pass through the camera system, but at present the problem of discrimination is a difficult one because of the confusion created in the discriminator by the above described nonuniformity of the response in the screen and photocathode. That is, such nonuniformity in responses not only masks the desired picture elements but also alters the apparent energy levels of the picture and the noise seriously impairing the efficiency of the discriminator.

SUMMARY OF THE INVENTION

It is the object of this invention to essentially eliminate the present inherent problems in optical systems such as those employed in gamma ray cameras which give rise to nonuniform response to uniform stimulii.

According to the invention the optical system or camera incorporates an equalization filter which accurately compensates for the differences of efficiency of the system, e.g. for the differences of efficiency of both the crystal mosaic elements and the photocathode areas in a gamma ray camera so that the variations in image intensity transmitted by the filter accurately portray the actual variations in intensity of the emitted energy or gamma rays over the area being photographed.

It will also be apparent that such compensation for the efficiency differences in the phosphor screen and the photocathode will effectively eliminate masking of the relative energy levels of the scintillations from the picture source and any scintillations caused by noise so that these relative energies can be determined and therefore much more efficient discrimination against noise can be effected.

BRIEF DESCRIPTION OF DRAWINGS

The invention will be more fully understood from the accompanying drawing which is a diagrammatic illustration of a gamma ray camera embodying a filter in accordance with the invention.

DETAILED DESCRIPTION OF INVENTION

With reference to the drawing the objects under study emits gamma rays which are collimated for example through a pinhole B in a shielding material L. Scintillations from this source which then occur on the phosphor preferably a sodium iodide crystal mosaic, $P_1$ create the information which is wanted in the final picture elements. As is well known a large area of phosphor is needed to yield high counting efficiency together with a picture of good definition. For example, an area of 8 inches in diameter is conveniently used for a high speed medical gamma ray camera. The crystal mosaic elements making up this screen $P_1$ will scintillate in accordance with the intensity of the gamma ray bombardment and their own inherent efficiency to produce light flashes for processing by image intensifier $I_1$. The image intensifier $I_1$ has a photocathode $C_1$ of the same area as and in optical contact with the crystal mosaic $P_1$. The photocathode $C_1$ converts each scintillation into a corresponding small pencil of electrons. It will be understood that various areas of the surface of the cathode $C_1$ will have various efficiencies of conversion so that the electron current produced throughout the area of the photocathode surface will be dependent upon the intensity of the impinging scintillation and the efficiency of conversion.

It is desired that the electron ray pencils or electron current produced by the cathode $C_1$ be focused to a substantially smaller area for further processing for example to an area of 1 inch in a medical gamma ray camera and these focused electron pencils produced by the photocathode $C_1$ are directed onto a second phosphor screen $P_2$ where they are converted into scintillations again varying in intensity according to the intensity of the impinging electron pencils and the efficiency of the individual crystal mosaic elements making up the screen $P_2$.

It will thus be understood that the picture outlined by the scintillations produced at $P_2$ will be defined by the intensity of such scintillation throughout the area of $P_2$ and the intensity of such scintillations will in turn be dependent upon the energy of the emitted gamma rays from the source S, the relative efficiencies of the crystal mosaic elements in the screen $P_1$, the relative efficiencies of the conversion areas of the photocathode $C_1$ and the relative efficiencies of the crystal mosaic elements making up the screen $P_2$. It is of course of utmost importance for the ultimate usefulness of the picture to be able to distinguish between the actual relative intensities of the gamma rays emitted from various portions of the source S and the relative intensity errors or factors introduced by the efficiency differences in the component parts of the camera.

Up to the present time no completely reliable means has been available to clearly distinguish between the information which appears to be related to the source S but may well be caused by the relative efficiency factors of different portions of the camera elements such as $C_1$, $P_1$ and $P_2$.

According to the present invention this problem is overcome by inserting an equalizing filter F, at an appropriate optical plane of the camera for example at the optical plane coinciding with the screen $P_2$. This filter is produced in the following manner.

An unexposed photographic film is introduced for example, at the optical plane corresponding to the location of the screen $P_2$ and its position relative to the adjoining camera elements is accurately registered. The screen $P_1$ constituted by the mosaic of crystal elements is then uniformly illuminated by means of X-rays or other reliable radiation source so as to expose the film F. The exposed film is then developed and it will be appreciated that the negative resulting from the development of the exposed film can be made to have variations in density precisely corresponding to the variations in intensity of the light emanating from the screen $P_2$, being denser or darker over the areas which were exposed to areas of higher intensity light emanating from the screen and being less dense or lighter over areas which were exposed to areas of lower intensity light emanating from the screen. Since the original source of X-ray or radiation was uniform over the whole screen $P_1$ such areas of higher and lower light intensity emissions from the screen $P_2$ accurately represent the differences in efficiency of the camera elements up to the optical plane at $P_2$. Thus the exposed film density variations also accurately represent such camera component efficiency differences. As will be understood, the light transmission capabilities of the negative film are precisely the inverse of the density characteristics being maximum through the less dense areas and proportionately less through the areas of proportionately greater density.

The developed negative which now constitutes the desired filter F is precisely registered in place at the optical plane $P_2$ in exactly the same position as it occupied before exposure. With the filter F thus in place the output from the image intensifier $I_1$ when exposed to a uniform radiation source as viewed through the filter F will in turn be uniform with the film density variations counteracting or compensating for the efficient variations of the camera elements. Where, however, there is a variation in the intensity of the radiation emitted by the source such as the source S illuminating the crystal mosaic $P_1$, such variations will be correctly reproduced in the image that has been passed through the filter F.

The image or information passed through the filter F is shown in the figure as being delivered through a lens system O to a second image intensifier $I_2$ which will incorporate a photocathode $C_2$ and a crystal mosaic screen $P_3$ to produce a visual image which may then be photographed or recorded as desired.

In the gamma ray camera used as an example the image intensifier $I_1$ enhances the scintillation brilliance only by electron acceleration and the brilliance gain is relatively limited. Also the picture size is reduced. On the other hand the image intensifier $I_2$ may for example, contain thin semipermeable diaphrams D which also provides secondary electron multiplication giving much greater brilliance gain and the size of the picture is retained so that the differences in picture brilliance focused on the second intensifier $I_2$ will be very readily distinguishable in the final image output of the intensifier. The focus coil $F_1$ allows the image on the photocathode $C_2$ to be transferred to the phosphor $P_3$ while retaining picture detail. Thus the second image intensifier such as $I_2$ to which an accurate image is delivered through the lens system O does not create the same problems by virtue of component efficiency differences to anything like the same extent as the first image intensifier $I_2$ and for this reason a single compensating filter F at the one optical plane at the screen $P_2$ has been found sufficient.

It will be understood however that, if desired, filters corresponding to the filter F could be located at any additional focal plane such as at $P_3$ to provide any desired optical compensation.

Where the intensity of the emission from the source S is very limited it is desirable to gate the second intensifier $I_2$ so that it is only operative to transmit intelligence when there is an appropriate picture element being delivered through the first intensifier $I_1$. That is, only when scintillations within a predetermined range of brilliance or energy are present are they to be accepted as picture elements. Scintillations of a different energy range produced for example by cosmic rays and isotope gamma rays degenerated by Compton scatter in the tissue and constituting unwanted noise are to be discarded. For this reason there is shown a signal analyzer or discriminator M which picks off a small and useable portion of the emitted signal from the photocathode $P_2$ after delivery through the filter F and when such emitted signal contains scintillations have a brilliance or energy within the desired energy range the discriminator M delivers it through a suitable control circuit E to a gate G. While such a control gating system is not always used in a gamma ray camera, nevertheless, it will be understood when such a system is used its efficiency is greatly increased by the addition of the filter F in accordance with the present invention whereby erroneous differences in scintillation brilliance due to phosphor and photocathode variation are eliminated.

It will be understood that when the filter F is prepared by exposing it to a uniform intensity radiation energy delivered on to the screen $P_1$ and then developed, it must be precisely located back in its original position which it occupied at the time of exposure so that its compensating density variations will accurately register with the appropriate initial light intensity variations produced as a result of the relative efficiencies of the component parts of the camera up to the optical plane at which the filter is located. It will be appreciated that any desired means may be utilized to effect such registration in accordance with the invention.

It will also be understood that a simple embodiment of a gamma ray camera is shown for purposes of illustrating the principles of the invention but that the application of a compensating filter according to the invention may be made at the appropriate optical plane or planes in any optical system where such compensation is desired or required.

I claim:

1. A compensating filter for use in a predetermined registered position at an optical plane in an optical system having differences in efficiencies such that energy from a uniform source creates light of varying intensities over the area of such optical plane said filter being characterized in that it has varying light transmission characteristics over its area which substantially inversely match the variations in light intensities from a uniform source over the area of the optical plane with which the filter is adapted to register whereby light transmitted from a uniform source through the system and filter is uniform.

2. A compensating filter as claimed in claim 1 in which said filter comprises a film negative having varying densities over its area which correspond to the variations of light intensity over such optical plane area created by a uniform source, being greatest where the light intensity is greatest and vice versa.

3. A compensating filter for a gamma ray camera for use in a registered position at an optical plane in the camera system having at least one phosphor screen and at least one photocathode in advance of such plane, said compensating filter having areas of different light transmission characteristics which inversely correspond to the cumulative efficiency of the preceding phosphor screen and photocathode element areas directing light from a uniform intensity energy source to impinge on such filter areas whereby said filter produces a substantially uniform light intensity output when a uniform light producing energy source is directed onto the camera.

4. A compensating filter as claimed in claim 3 in which said filter comprises a film negative having areas of different densities which inversely correspond to the cumulative efficiencies of the areas of the preceding phosphor screen and photocathode elements causing light of different intensities from a uniform energizing source to impinge on such film areas.

5. In a gamma ray camera having at least one phosphor screen and one photocathode which because of the differences in efficiencies of areas of such elements produce non uniform light intensities over an optical plane area when the camera is energized by a uniform source, a compensating filter located at said optical plane and having non uniform light transmission characteristics over the area thereof which inversely correspond to such non uniform light intensities created by a uniform source impinging on said optical plane whereby the light output of the filter in response to a uniform source is substantially uniform in intensity over its filtering area.

6. In a gamma ray camera as claimed in claim 5 in which said filter comprises a film negative having a non uniform density which corresponds to the non uniform light intensities created by a uniform source impinging on said optical plane having its greatest density at the area where the light intensity is greatest and vice versa.

7. In a gamma ray camera as claimed in claim 6 a discriminator and a gating circuit for controlling an optical system subsequent to said optical plane, said discriminator being arranged to sample light output from said filter.

* * * * *